(12) United States Patent
Ausner et al.

(10) Patent No.: US 12,186,795 B2
(45) Date of Patent: Jan. 7, 2025

(54) PLANT AND PROCESS FOR EFFICIENTLY PRODUCING A STRUCTURED CROSS-CHANNEL PACKING ELEMENT

(71) Applicant: Sulzer Management AG, Winterthur (CH)

(72) Inventors: Ilja Ausner, Oehningen (DE); Marc Wehrli, Brütten (CH); Florian Kehrer, Illnau-Effretikon (CH); Yves Torgler, Winterthur (CH)

(73) Assignee: Sulzer Management AG, Winterthur (CH)

( * ) Notice: Subject to any disclaimer, the term of this patent is extended or adjusted under 35 U.S.C. 154(b) by 90 days.

(21) Appl. No.: 17/768,755

(22) PCT Filed: Sep. 28, 2020

(86) PCT No.: PCT/EP2020/077155
§ 371 (c)(1),
(2) Date: Apr. 13, 2022

(87) PCT Pub. No.: WO2021/073861
PCT Pub. Date: Apr. 22, 2021

(65) Prior Publication Data
US 2024/0109118 A1     Apr. 4, 2024

(30) Foreign Application Priority Data
Oct. 14, 2019  (EP) ..................................... 19202995

(51) Int. Cl.
*B21D 43/02*    (2006.01)
*B21D 1/05*    (2006.01)
(Continued)

(52) U.S. Cl.
CPC ............. *B21D 43/027* (2013.01); *B21D 1/05* (2013.01); *B21D 43/06* (2013.01); *B21D 43/08* (2013.01);
(Continued)

(58) Field of Classification Search
CPC ...... B21D 43/027; B21D 43/06; B21D 43/08; B21D 43/287; B21D 5/16; B23P 15/26; Y10T 29/18; Y10T 29/185
See application file for complete search history.

(56) References Cited

U.S. PATENT DOCUMENTS 1,224,877 A * 5/1917 Clark ................... B21D 31/046
                                              29/6.1
1,436,866 A * 11/1922 Dickinson ............ B21D 31/046
                                              29/6.1
(Continued)

FOREIGN PATENT DOCUMENTS

CA      1270751 A      6/1990
CN      88200252 U     9/1988
(Continued)

OTHER PUBLICATIONS

European Search Report issued Apr. 8, 2020 in corresponding European Application No. 19202995.7.
(Continued)

*Primary Examiner* — Jason L Vaughan
(74) *Attorney, Agent, or Firm* — Global IP Counselors, LLP

(57) ABSTRACT

A plant for producing a structured cross-channel packing element. The structured cross-channel packing element comprises at least two adjacent layers made of expanded metal sheets each comprising periodic deformations. The plant comprises a stretching machine configured to cut and stretch a metal sheet to form one of a plurality of first
(Continued)

expanded metal sheets, a calibration machine configured to roll the first expanded metal sheets to a desired thickness, a sheet storage unit configured to directly receive each of the first expanded metal sheets rolled in the calibration machine, a forming machine configured to form each of the first expanded metal sheets to form the expanded metal sheets comprising periodic deformations, and a stacking machine configured to stack the expanded metal sheets comprising periodic deformations to form the structured cross-channel packing element. The sheet storage unit is configured to release the first expanded metal sheets directly to the forming machine.

15 Claims, 11 Drawing Sheets

(51) Int. Cl.
   *B21D 5/16* (2006.01)
   *B21D 43/06* (2006.01)
   *B21D 43/08* (2006.01)
   *B21D 43/28* (2006.01)
   *B23P 15/26* (2006.01)
(52) U.S. Cl.
   CPC ............ *B21D 43/287* (2013.01); *B23P 15/26* (2013.01); *B21D 5/16* (2013.01)

(56) References Cited

U.S. PATENT DOCUMENTS

| | | | | |
|---|---|---|---|---|
| 1,862,221 A * | 6/1932 | Kaminetsky | ......... | B21D 31/046 29/6.1 |
| 2,988,128 A * | 6/1961 | Van Pappelendam | ....................... | B21D 47/00 72/176 |
| 3,853,626 A * | 12/1974 | Daniels, Jr. | ............. | B23P 13/00 72/203 |
| 4,296,050 A | 10/1981 | Meier | | |
| 4,486,927 A * | 12/1984 | Hunter | ................ | B21D 31/046 29/6.1 |
| 4,567,630 A * | 2/1986 | Ishida | ..................... | B01J 35/30 427/247 |
| 4,981,621 A | 1/1991 | Pluss | | |
| 5,093,971 A * | 3/1992 | Hein | ..................... | B21D 31/04 29/6.1 |
| 5,142,755 A * | 9/1992 | Alhamad | ............... | B65D 81/02 29/6.1 |
| 5,461,761 A | 10/1995 | Knöpfli | | |
| 6,206,349 B1 | 3/2001 | Parten | | |
| 8,578,576 B2 * | 11/2013 | Castricum | ............ | B21C 37/124 29/6.2 |
| 10,376,860 B2 | 8/2019 | Wehrli | | |
| 10,519,667 B1 * | 12/2019 | Ealer, Sr. | ............. | B21D 47/005 |
| 2002/0002853 A1 | 1/2002 | Gerard | | |
| 2011/0067372 A1 | 3/2011 | Wallner et al. | | |

FOREIGN PATENT DOCUMENTS

| | | |
|---|---|---|
| CN | 1049372 C | 2/2000 |
| CN | 202129345 U | 2/2012 |
| CN | 204019127 U | 12/2014 |
| CN | 207126533 U | 3/2018 |
| DE | 1253673 B | 11/1967 |
| EP | 1044787 B1 | 3/2003 |
| GB | 1004046 | 9/1965 |
| GB | 1569828 | 6/1980 |
| RU | 2184606 C2 | 7/2002 |
| WO | 2014195233 A1 | 12/2014 |

OTHER PUBLICATIONS

International Search Report & Written Opinion issued Nov. 19, 2020 in corresponding International Application No. PCT/EP2020/077155.

International Preliminary Report on Patentability issued Oct. 14, 2019 in corresponding International Application No. PCT/EP2020/077155.

Taiwanese Office Action issued Oct. 12, 2023 in corresponding Taiwanese Application No. 109135019.

* cited by examiner

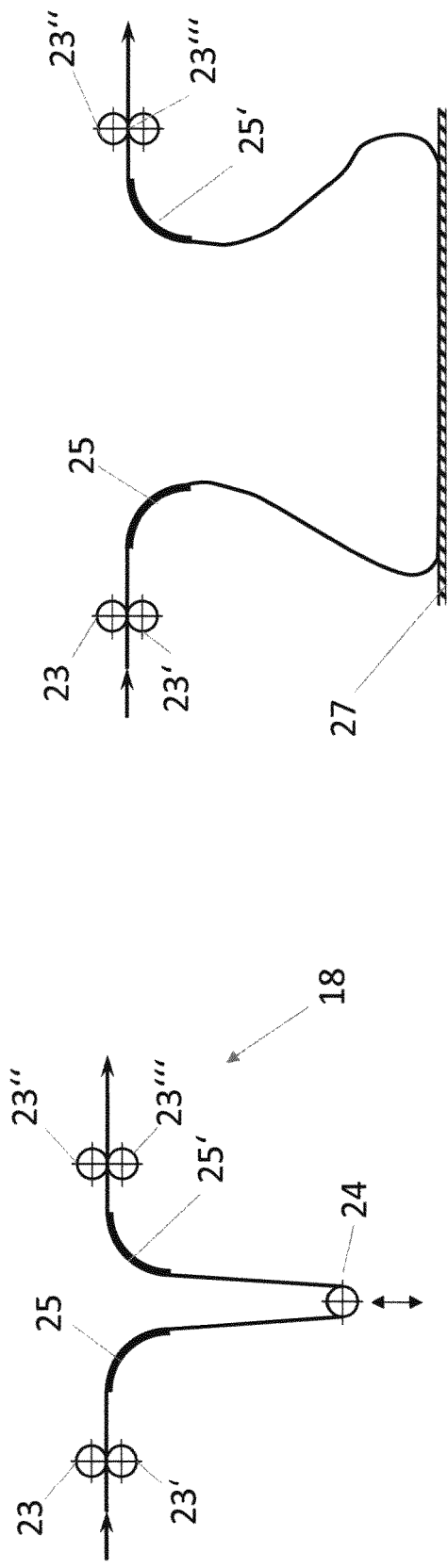
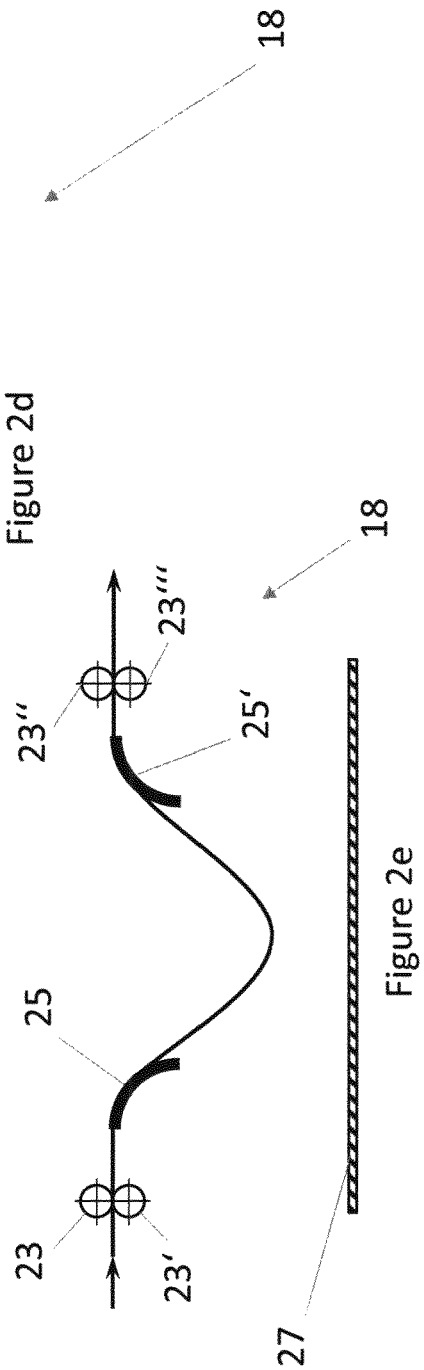
Figure 2c
Figure 2d
Figure 2e

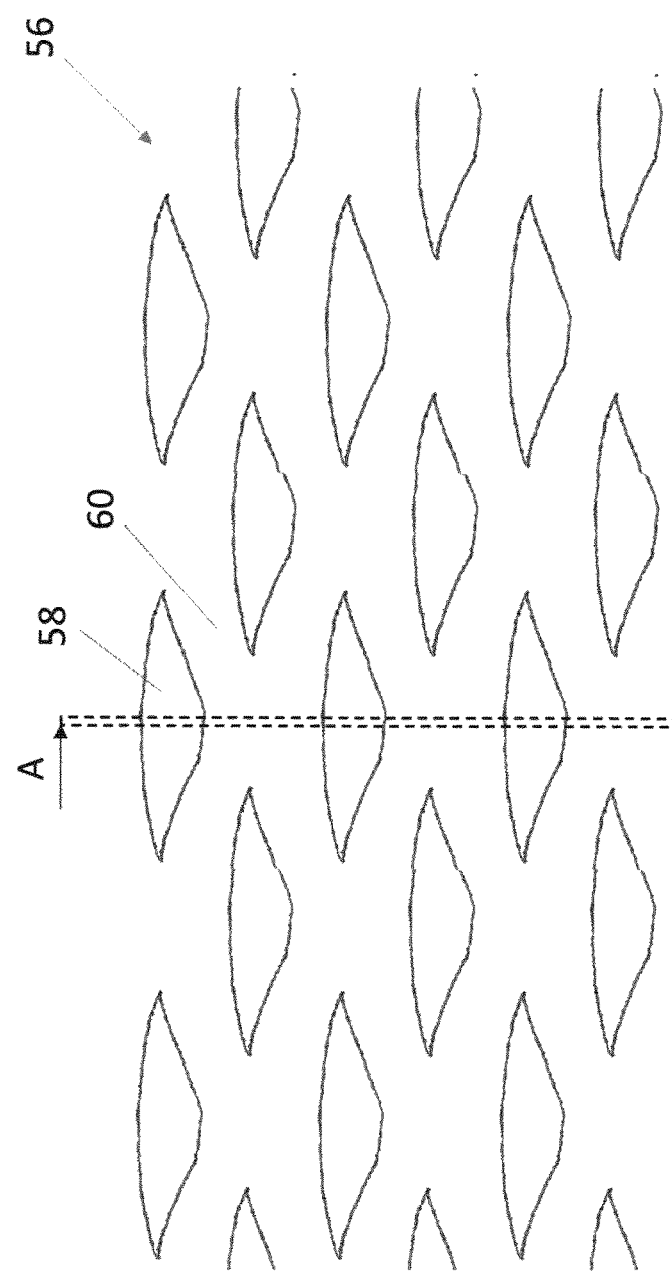
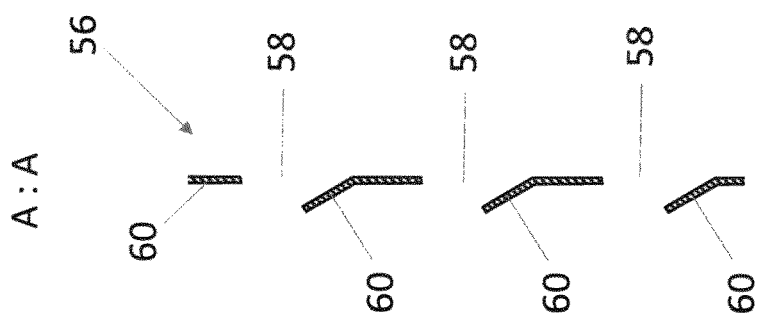
Fig. 7
Fig. 7a
Fig. 7b

PLANT AND PROCESS FOR EFFICIENTLY PRODUCING A STRUCTURED CROSS-CHANNEL PACKING ELEMENT

CROSS-REFERENCE TO RELATED APPLICATION

This application is a U.S. National Stage application of International Application No. PCT/EP2020/077155, filed Sep. 28, 2020, which claims priority to European Application No. 19202995.7, filed Oct. 14, 2019, the contents of each of which are hereby incorporated by reference.

FIELD OF THE INVENTION

The present disclosure relates to a plant and process for efficiently producing a structured cross-channel packing element for a column for mass transfer and/or heat exchange between a heavy fluid phase and a light fluid phase.

BACKGROUND INFORMATION

Structured packing elements are used in mass transfer columns, such as for instance in fractionation columns, distillation columns, absorption columns, extraction columns or flue gas scrubbers. The structured packing elements serve for the improvement of the mass transfer and/or heat transfer between at least two fluid phases of different densities, wherein the structured packings elements are typically operated in counter-current flow. While in distillation and absorption applications, the light phase is a gas or vapor and the heavy phase is a condensate or liquid, in extraction processes both phases are liquids with different densities. The structured packing elements comprise a plurality of different layers, each providing surface area for the heavier phase that trickles down along the surface of the layer and spreads. In addition, between the different layers of the structured packing elements, open spaces are provided which are filled with the light phase (e.g. vapor or gas in distillation) and provide a path for the light phase to ascend, while it is driven by a pressure gradient. The pressure gradient is required to overcome the flow resistance. In the typical case of counter-current mass transfer, the average flow direction of the light phase is from bottom to top of the structured packing element and thus opposite to the average flow direction of the heavy phase. By allowing the one heavy phase to spread on the surface of the structured packing element, an interface is created between the at least two phases so that an efficient heat and mass transfer between the phases is established at the interface. There may also be applications with more than one heavy phase. An example is extractive distillation.

A mass transfer column usually comprises several beds of structured packing elements. Typically, a distributor is arranged on top of each bed to evenly distribute the heavy phase over the cross-section of the bed, while leaving enough space for the light phase to ascend through it. Moreover, often a grid-like holding device and a collector are arranged below each bed, wherein the grid-like structure keeps the bed at its position and the collector collects the heavy phase trickling down from the bed, while sufficient open space is left in the collector for the light phase to ascend.

A common type of structured packing element is the so-called cross-channel corrugated sheet packing, which is assembled from a plurality of corrugated sheets, which are arranged parallel and in touching contact with each other. Typically, the corrugated metal sheets are fixed to each other by means of several rods penetrating the corrugated sheets perpendicular to the longitudinal section of the corrugated sheets, wherein the rods are fixed with the first and last corrugated sheet using a washer and a nut or by bending the rod. Each corrugated sheet comprises a plurality of periodic deformations, such as alternately oriented peaks and valleys, wherein adjacent corrugated sheets are oriented such that the corrugations of the adjacent corrugated sheets intersect in crisscross fashion with the corrugations of the corrugated sheets extending obliquely relative to the vertical or longitudinal direction, thus forming inclined channels which continuously cross one another. These channels positively influence the flows of the gas phase and of the liquid phase within the packing and facilitate the mass transfer between the phases. That is, the gas phase and the liquid phase are brought into contact in the channels of the structured packing element and the mass transfer as well as the heat transfer between the phases is thus facilitated. More specifically, ascending gas comes into contact with liquid, which is present on the surface of the sheets forming the channels when it flows downwardly through the mass transfer column. During this contact, a component enriched in the gas can transfer into the liquid and vice versa; this means that an efficient mass transfer can take place. Such packings are described for example in DE 1 253 673, in CA 1270751 and in U.S. Pat. No. 6,206,349 B1.

The amount of mass transfer per unit time is proportional to the area of the interface between the gas and the liquid, wherein the area of the interface gets larger with an increasing portion of the surface of the packing element's layers which is wetted by the liquid. Cross-channel corrugated sheet packings made of metal gauze are known to have an excellent wettability thanks to a good spreading of the heavy phase on the surface of the corrugated sheets due to capillary force of the metal gauze, and, thus on account of the excellent wettability, a high mass transfer efficiency. However, metal wire gauze is an expensive material. Alternative suggestions to promote the spreading of the heavy phase over the surface of the layers—instead of using metal gauze or corrugated, very fine expanded metal sheets as material for the structured packing element—are to provide the layers with perforation and another surface texture, such as described in U.S. Pat. No. 4,296,050, in GB 1,569,828, in U.S. Pat. No. 4,981,621 and in EP 3 003 550 A1. In addition, it was proposed in CN 882 00252 U to provide cross-channel corrugated sheet packings made of expanded metal sheets, i.e. perforated layers having a high void fraction, i.e. a high ratio of the total area of the openings in the layer divided by the sheet area of the layer. A particular further advantage of such cross-channel corrugated sheet packings made of expanded metal sheets is that they are comparably cost-efficient.

Usually, cross-channel corrugated sheet packings made of expanded metal sheets are produced by forming expanded metal sheets obtained from a supplier to corrugated sheets, cutting these corrugated sheets to the desired size and stacking them to form a structured packing element. The expanded metal sheets themselves are typically produced by the provider by cutting and nearly simultaneously stretching metal sheets. However, producing cross-channel corrugated sheet packings with expanded metal sheets obtained from a supplier requires transport expenses. Moreover, for the transport and further processing, the expanded metal sheets have to be coiled under tension onto sleeves made for instance of cardboard. However, since the expanded metal sheets each have a structured surface, the expanded metal sheets cannot be coiled exactly "edge-on-edge." Rather, the single expanded metal sheets arranged on top of each other shift with regard to each other leading to a tension in the coil, which negatively affects the further processing. Moreover, due to the misalignment of the single sheets, at least some parts of the single sheets protrude from the sleeve, which easily leads to a deformation of the protruding parts during the transport.

In view of the above, the object underlying the present disclosure is to provide a plant and process for quickly and cost-efficiently producing a structured cross-channel packing element for a column for at least one of mass transfer and heat exchange between a heavy fluid phase and a light fluid phase, which further overcome the aforementioned drawbacks.

In accordance with an embodiment of the present disclosure, this object is satisfied by providing a plant for producing a structured cross-channel packing element for a column for at least one of mass transfer and heat exchange between a heavy fluid phase and a light fluid phase, wherein the structured cross-channel packing element comprises at least two adjacent layers made of expanded metal sheets each comprising openings that are surrounded and separated from each other by separating elements, and each comprising periodic deformations, wherein at least two of the at least two layers are arranged in a longitudinal direction of the packing element parallel and in touching contact with each other such that an open space extending from one end to an opposite end of the at least two layers is provided between the at least two layers such that at least one of the heavy fluid phase and the light fluid phase may flow therethrough, wherein the plant comprises:

a stretching machine configured to cut and stretch a metal sheet to form one of a plurality of first expanded metal sheets, a calibration machine configured to roll each of the first expanded metal sheets produced in the stretching machine to a desired thickness, a sheet storage unit, a forming machine configured to form each of the first expanded metal sheets rolled in the calibration machine to form the expanded metal sheets comprising periodic deformations, and a stacking machine configured to stack the expanded metal sheets comprising periodic deformations to form the structured cross-channel packing element, wherein the sheet storage unit is configured to directly receive each of the first expanded metal sheets rolled in the calibration machine and to release the first expanded metal sheets directly to the forming machine.

By providing a sheet storage unit between the stretching machine and the forming machine, the different velocities of the stretching machine and the forming machine can be compensated or buffered, respectively, so that nevertheless the structured cross-channel packing element can be produced in a semi-continuous process. More specifically, the stretching machine as well as the forming machine work stroke-like or hub-like, respectively, wherein the length of sheet transported during one stroke of the stretching machine is the product of the width of the separating elements and the stretching factor, by which the metal sheet is stretched in the stretching machine, whereas the length of sheet transported during one stroke of the forming machine is the quotient of the distance between two adjacent periodic deformations of the sheet and the cosine of the angle $\alpha$, by which the corrugations are inclined with respect to the longitudinal direction. For instance, for an expanded metal sheet with a distance between two adjacent periodic deformations of 20 mm, an angle $\alpha$ of 45° and a stretching factor of 1.25 the length of sheet transported during one stroke of the stretching machine is 2.5 mm, whereas the length of sheet transported during one stroke by the forming machine is 28.3 mm. Therefore, the expanded metal sheet prepared in the stretching machine and rolled in the calibration machine cannot be directly transported into the forming machine.

A further particular advantage of the present disclosure is that the present disclosure allows maintenance of the direction, with which the expanded metal sheet is produced in the stretching machine and released from the stretching machine, before it is fed into the forming machine. In other words, the plant of the present disclosure allows transportation of the expanded metal sheet in the stretch direction into the forming machine. This is a particular advantage due to the following reasons: After production, i.e. cutting and stretching of a metal plate, the resulting expanded metal sheet is not flat anymore, but rather has a structured surface. This is the result of deformation, distortion, bending or vaulting of individual separating elements and a relative deformation of separating elements compared to others, e.g. by tilting. The expanded metal sheet comprises in the stretch direction flat flanks, but in the opposite direction comparable steep flanks, as shown in FIG. 7. Thus, by transporting the expanded metal sheet in the stretch direction into the forming machine, the expanded metal sheet is transported with its flat-flanked side into the forming machine. However, conventionally, the expanded metal sheet is first coiled onto sleeves, before it is later uncoiled from the sleeve, which mandatorily leads to an inversion of the conveying direction of the expanded metal sheet. Therefore, in conventional processes, the expanded metal sheet is transported into the forming machine with its steep-flanked side, which impedes the conveyance of the expanded metal sheet. Moreover, this has the disadvantages that the expanded metal sheet may get stuck, which may lead to forming errors, i.e. unwanted deformations, and that the steep flanks will abrade the forming tool stronger and faster than flat flanks.

The feature that the sheet storage unit is configured to directly receive the expanded metal sheet produced in the stretching machine and rolled in the calibration machine and to release the expanded metal sheet directly to the forming machine means that, if the plant does not comprise a calibration machine, the sheet storage unit is configured to directly receive the expanded metal sheet produced in the stretching machine from the stretching machine, and, if the plant does comprise a calibration machine, the sheet storage unit is configured to directly receive the rolled expanded metal sheet from the calibration machine.

The longitudinal direction of the structured packing element is the average direction of the structured packing element, in which during its operation, such as its operation in a column for mass transfer and/or heat exchange, such as in a rectification column, the light phase ascends and the heavy phase descends. Although the light phase may be divided due to the interaction with the shape of the structured packing element into several streams having entirely different orientations, the average direction of the light phase coincides with the longitudinal direction, which is usually close to the vertical direction.

Typically, the stretching machine works—i.e. it is operable to work—stroke-like with a first stroke frequency and the forming machine works—i.e. it is operable to work—stroke-like with a second stroke frequency, wherein the first stroke frequency is greater than the second stroke frequency.

As set out above, the stretching machine is configured to release during each stroke a first length of expanded metal sheet and the forming machine is configured to release during each stroke a second length of expanded metal sheet comprising periodic deformations, wherein typically the first length is smaller than the second length.

More specifically, the stretching machine usually has a higher stroke frequency than the forming machine, but transports during a stroke less length of expanded metal sheet than the forming machine. Thus, when a stroke of the forming machine starts, the forming machine needs per given time interval more sheet length than transported by the stretching machine, whereas after termination of a stroke of the forming machine, the stretching machine still releases sheet length, which is not required in this time period by the forming machine, until the next stroke of the forming machine starts. In accordance with the present disclosure, the different material requirements of the stretching machine and the forming machine over the different stroke cycles of both machines are compensated or buffered, respectively, by the sheet storage unit.

The present disclosure is not particularly limited concerning the kind of sheet storage unit, as long as the sheet storage unit is able to store for a short period of time, namely for a period of time of less than 1 minute, expanded metal sheet produced in the stretching machine and optionally rolled in the optional calibration machine without exercising tension and/or pressure to the expanded metal sheet, such as it happens during coiling of expanded metal sheet onto a sleeve made for instance of cardboard, and thus without deforming the expanded metal sheet. In other words, sheet storage unit means in accordance with the present disclosure any unit, which is capable of temporarily storing expanded metal sheet produced in the stretching machine and optionally the calibration machine, before it is transported into the forming machine, so as to decouple the stretching machine and the forming machine so that differences in the release speed or feed speed, respectively, of the stretching machine and the forming machine may be balanced without need for stopping any or both of the stretching machine and the forming machine.

Preferably, the sheet storage unit comprises at least two deflection structures that are designed to deflect the expanded metal sheet produced in the stretching machine so that it is temporarily stored in the sheet storage unit.

In accordance with one variant of this embodiment, at least one and preferably all of the at least two deflection means is/are movable so that the distance between the at least two deflection structures can be varied. This allows the sheet storage unit to be loaded with an expanded metal sheet produced by the stretching machine and optionally rolled in the optional calibration machine during the time interval between two strokes of the forming machine by simply increasing the distance between the at least two deflection structures proportionally to the excess sheet length received from the stretching machine or calibration machine, respectively, and not required by the forming machine at this point of time. Moreover, this allows the sheet storage unit to be unloaded from the expanded metal sheet stored therein during the time interval of a stroke of the forming machine by simply decreasing the distance between the at least two deflection structures proportionally to the excess sheet length required by the forming machine in excess to that sheet length received during this point of time from the stretching machine or calibration machine, respectively.

Preferably, the sheet storage unit comprises at least two deflection rollers, from which at least one and preferably all are movable so that the distance between the at least two deflection rollers can be varied. Again, this the sheet storage unit to be loaded with an expanded metal sheet produced by the stretching machine and rolled in the optional calibration machine during the time interval between two strokes of the forming machine by simply increasing the distance between the rollers proportionally to the excess sheet length received from the stretching machine or calibration machine, respectively, and not required by the forming machine at this point of time. Moreover, this allows the sheet storage unit to be unloaded from the expanded metal sheet stored therein during the time interval of a stroke of the forming machine by simply decreasing the distance between the rollers proportionally to the excess sheet length required by the forming machine in excess to that sheet length received during this point of time from the stretching machine or calibration machine, respectively.

Good results are particularly obtained, when the sheet storage unit comprises at least four, more preferably at least six and most preferably at least eight deflection rollers. Independently form the number of deflection rollers, one or more and preferably all of the deflection rollers are movable preferably in the vertical direction, in the horizontal direction and/or in any other direction so that the distance between at least two of the rollers and preferably between each two of the rollers can be varied in the vertical direction, in the horizontal direction and/or in any other direction. This leads to a respective sheet storage unit with a quite high expanded metal sheet capacity, but which merely requires a comparable small amount of area.

In accordance with another variant of this embodiment of the present disclosure, not all of the deflection rollers are movable, but only one or more than one, but less than all deflection rollers.

In accordance with still another variant of this embodiment of the present disclosure, the sheet storage unit comprises as at least two deflection structures at least one deflection roller and at least one deflection plate, wherein at least one deflection roller is movable and preferably the at least one deflection plate is curved. If the storage unit comprises two or more deflection rollers, only one deflection roller, some of the deflection rollers or all of the deflection rollers may be movable. Moreover, none, one or more or even all of the at least one deflection plates may be movable. The sheet storage unit of this embodiment may comprise at least two or at least four or at least six deflection rollers and at least two or at least four or at least six deflection plates. The deflection plate(s) is/are configured to deflect the expanded metal sheet from an upstream deflection means to a downstream deflection structure or, in case of the most downstream deflection structures from an upstream deflection structure to the forming machine, or in case of the most upstream deflection structure from the upstream stretching machine or the optional calibration machine to a downstream deflection structure. This is preferably achieved by a respective curvature of the deflection plate(s). The total distance of the expanded metal sheet in the sheet storage unit is then adjusted by the at least one movable deflection roller and/or at least one movable deflection structure, if any.

In accordance with still another variant of this embodiment of the present disclosure, the sheet storage unit comprises as at least two deflection structures no deflection roller, but at least two, preferably at least four, more preferably at least six and most preferably at least eight deflection plates. At least one or more than one or all of deflection plates may be movable so that the distance between the at least two deflection plates can be varied. Preferably, the at least one deflection plate is curved. The working principle is the same as for the embodiment comprising movable deflection roller(s).

In accordance with still another variant of this embodiment of the present disclosure, the sheet storage unit comprises as at least two deflection structures no deflection roller, but at least two and preferably at least four, more preferably at least six and most preferably at least eight deflection plates, wherein none of the at least two deflection structures is movable, i.e. all of the deflection structures are fixed. Preferably, the at least one deflection plate is curved. In this case the storage of the expanded metal sheet is effected so that expanded metal sheet is pushed for storing in the sheet storage unit into the space between the deflection structures by pushing the expanded metal sheet faster over an upstream deflection plate than withdrawing the expanded metal sheet over a downstream deflection plate so that more length of the expanded metal sheet is present in the storage unit. For unloading the storage unit, the expanded metal sheet is withdrawn over a downstream deflection plate faster than it is pushed over an upstream deflection plate so that less length of the expanded metal sheet is present in the storage unit.

Any conventional stretching machine may be used in the present disclosure, as long as it is suitable for producing an expanded metal sheet from a metal sheet. Typically, the stretching machine comprises at least one knife for cutting and stretching within the same stroke of the stretching machine the metal sheet when the metal sheet is fed through the stretching machine using a pressured slitting and stretching process. More specifically, the slits created by the knife allow the metal to be stretched, which produces uniform openings. To ensure a consistent pattern, the expanding machine is programmed and operated manually or automatically based on the programming as the metal is fed through.

As set out above, a calibration machine may be included in the plant or not. However, it is preferred that the plant comprises a calibration machine. Any conventional calibration machine may be used in the present disclosure, as long as it suitable for rolling an expanded metal sheet to a desired thickness. If present, the calibration machine is arranged between the stretching machine and the sheet storage unit. Preferably, it comprises at least two rollers, through which the expanded metal sheet is fed and provided with a pressure so as to roll the expanded metal sheet to a desired thickness.

Also, any conventional forming machine may be used in the present disclosure, as long as it is suitable for forming an expanded metal sheet comprising periodic deformations. It is preferred that the forming machine comprises one or more first shaping units for pleating the expanded metal sheet, a device for continuously forwarding the expanded metal sheet to the one or more first shaping units and at least one device for drawing off the pleated expanded metal sheet.

In a further embodiment of the present disclosure, the forming machine further comprises one or more second shaping units for reshaping the pleated expanded metal sheet using a roller pair which has no reshaping profilings in a middle zone, but reshaping profilings in terminal zones. This allows bending of the periodic deformations in the terminal portions of the expanded metal sheets of the structured packing element in relation to the periodic deformations of the central portion being arranged between the terminal portions. Accordingly, the peaks and valleys of the expanded metal sheet of this embodiment do not extend linearly. Preferably, the periodic deformations are bent in the terminal portions of the expanded metal sheet so as to extend at least essentially vertically. Essentially vertical means that the peaks and valleys are not inclined at the lower and upper edges of the expanded metal sheet more than 10°, preferably not more than 5° and more preferably not more than 2° to the vertical direction. Thereby, the flow resistance in the terminal zones of the structured packing element is reduced with respect to that of the zone arranged between the terminal zones and the pressure loss of the structured packing element is reduced.

Alternatively, the forming machine may have a lower tool element and an upper tool element, wherein each of the upper tool element and the lower tool element having a front side and a rear side. While the lower tool element comprises a first base element and a first finger element projecting from the first base element, wherein the first finger element forms a first ridge for forming a corrugation peak in the sheet, the upper tool element comprises a second base element and a second finger element projecting from the second base element, wherein the second finger element forms a second ridge for forming a corrugation trough in the sheet. The first ridge is arranged opposite to the second ridge and the first ridge is offset from the second ridge so as to allow for an engagement of the first finger element and the second finger element in an engaged position. Each of the first ridge and second ridge comprises a main portion and an end portion and the angle between each of the first ridge and second ridge in the main portion and the corresponding front side is at least partly different from the angle between each of the first ridge and second ridge in the end portion and the corresponding front side. Moreover, a space may be provided between the first finger element and the neighboring second finger element in the engaged position. The space is measured in the plane, in which the sheet enters the shape forming tool. The space is thus an open space. This open space is present between the main portion as well as the end portion when the upper and lower tool elements are in their engaged position. The sheet is thus in contact with the upper and lower tool element only at the ridges of the finger elements forming the top portions thereof, thus the crests. Between the ridge of the first finger element and the ridge of the second finger element, the sheet is not in contact with either finger element but is allowed to form freely in the space between two adjacent top portions.

Also, any conventional stacking machine may be used in the present disclosure, as long as it suitable for stacking expanded metal sheets comprising periodic deformations above each other to form a structured cross-channel packing element. Preferably, the stacking machine has one or more rotating cutting wheels for cutting the expanded metal sheets comprising periodic deformations to the desired size and a stacking unit for stacking the cut expanded metal sheets comprising periodic deformations to form a structured cross-channel packing element.

A further embodiment of the present disclosure is a process for producing a structured cross-channel packing element for a column for at least one of mass transfer and heat exchange between a heavy fluid phase and a light fluid phase, wherein the structured cross-channel packing element comprises at least two adjacent layers made of expanded metal sheets each comprising openings that are surrounded and separated from each other by separating elements, and each of the expanded metal sheets comprising periodic deformations, wherein at least two of the at least two layers are arranged in a longitudinal direction of the structured cross-channel packing element parallel and in touching contact with each other such that an open space extending from one end to an opposite end of the at least two layers is provided between the at least two layers such that at least one of the heavy fluid phase and the light fluid phase may flow therethrough, wherein the process comprises:

cutting and stretching a metal sheet to form one of a plurality of first expanded metal sheets, rolling each of the first expanded metal sheets to a desired thickness, feeding the first expanded metal sheets directly to a sheet storage unit, transporting the first expanded metal sheets directly from the sheet storage unit to a forming machine, forming the first expanded metal sheets in the forming machine to form the expanded metal sheets comprising periodic deformations, and stacking the expanded metal sheets comprising periodic deformations to form the structured cross-channel packing element.

In accordance with a particular preferred embodiment of the present disclosure, the process is performed in an aforementioned plant.

Good results are in particular obtained, when the metal sheet is stretched by a stretching factor of more than 1.0 to 1.5, preferably of between 1.1 and 1.5 and more preferably of between 1.2 and 1.35.

Preferably in the cutting and stretching step, a metal sheet is used, which has a sheet material thickness of 0.05 to 0.50 mm, preferably 0.08 to 0.2 mm and most preferably 0.09 to 0.15 mm. Sheet material thickness means the thickness of the material, which constitutes or forms the layer, respectively. Since in accordance with the present disclosure the layer is made by an expanded metal sheet, the sheet material thickness is the sheet thickness. Should the sheet thickness vary over the area of the layer, the sheet material thickness is the thickness of the sheet measured at one of the outer edges of the sheet material thickness by means of, for instance, a micrometer screw.

The present disclosure is not particularly limited concerning the material of the expanded metal sheets of the structured packing element. For instance, the expanded metal sheets may be made of stainless steel or a compound selected from the group consisting of aluminum, copper, titanium, zirconium and alloys.

As set out above, after production, i.e. cutting and stretching of a metal plate, the resulting expanded metal sheet is not flat anymore. This is the result of deformation, distortion, bending or vaulting of individual separating elements and a relative deformation of separating elements compared to others, e.g. by tilting. Other features like burrs may have resulted from a punching process and therefore contribute to the thickness. The resulting dimension of the expanded metal sheet is called grid thickness and may be up to several times larger than the layer material thickness. Preferably, the optional rolling step is performed and the expanded metal sheet is rolled to a grid thickness 1.0 to 1.4 mm, preferably 1.1 to 1.3 mm and more preferably 1.15 to 1.25 mm.

As set out above, the task of the sheet storage unit is to temporarily store expanded metal sheet compensating the different stroke cycles of the stretching machine and of the forming machine. More specifically, the sheet storage unit shall be loaded with expanded metal sheet produced by the stretching machine and the optional calibration machine during the time interval between two strokes of the forming machine, whereas the sheet storage unit shall be unloaded from expanded metal sheet stored therein during the time interval of a stroke of the forming machine. In practice, it is enough that the sheet storage unit stores expanded metal sheet for a short period of time, namely for a period of time of less than 1 minute. Accordingly, it is preferred that the sheet storage unit comprises at least two, more preferably at least four, still more preferably at least six and most preferably at least eight deflection rollers, which are all movable so that the distance between the at least two deflection rollers can be varied. It is in particularly preferred that the deflection rollers are all movable in the vertical direction so that the distance between each two of the rollers can be varied in the vertical direction. For instance, the sheet storage unit comprises upper rollers being fixed at a certain height and lower rollers, which are provided with weights so that the expanded metal sheet being guided alternatively by the upper and lower roller is kept tight. Thus, it is preferred that during a stroke of the stretching machine the rollers of the sheet storage unit are moved so as to increase the distance between the rollers, whereas during a stroke of the forming machine the rollers of the sheet storage unit are moved so as to decrease the distance between the rollers.

The present disclosure is not particularly limited concerning the kind of periodic deformations of the expanded metal sheets, as long as they allow stacking several sheets above each other to form a structured cross-channel packing element for a column for mass transfer and/or heat exchange between a heavy and a light fluid phase. In accordance with the present disclosure, the final structured packing element comprises at least two layers of expanded metal sheet arranged in the longitudinal direction parallel with each other. Parallel arrangement of two layers means in accordance with the present disclosure that one of the layers is inclined by an angle of at most +/−20°, preferably of at most +/−10°, more preferably of at most +/−5°, still more preferably of at most +/−2° with regard to the other layer and is most preferably not inclined at all with regard to the other layer.

In accordance with a particular preferred embodiment of the present disclosure, the expanded metal sheet is formed in the forming step to an expanded metal sheet comprising as periodic deformations corrugations comprising a plurality of alternately oriented peaks and valleys, wherein the angle between each of the peaks and each of the valleys with respect to the longitudinal direction is 10° to 60°, preferably 20° to 50° and more preferably 25° to 47°.

Preferably, the peaks and valleys are bent in the terminal portions of the expanded metal sheet in relation to the peaks and valleys of the central portion being arranged between the terminal portions so that the flow resistance in the terminal zones of the structured packing element is reduced with respect to that of the zone arranged between the terminal zones. Instead of providing such bends or different heights in both terminal zones, they may only be present in one of the terminal zones. As set out above, this allows reduction of the pressure loss of a structured cross-channel packing element for a column for mass transfer and/or heat exchange between a heavy and a light fluid phase formed from the respective layers.

In accordance with another embodiment of the present disclosure, the expanded metal sheet is formed in the forming step to an expanded metal sheet comprising as periodic deformations waves having a square, triangular or sinusoidal cross-section comprising peaks and valleys, wherein the angle between each of the peaks and each of valleys with respect to the longitudinal direction is 10° to 60°, preferably 20° to 50° and most preferably 25° to 47°.

Independently from the form of the periodic deformations, the distance between two adjacent periodic deformations of the expanded metal sheet is preferably 5 to 50 mm, more preferably 10 to 30 mm, even more preferably 15 to 25 mm and most preferably 28 to 22 mm, such as about 20 mm. The distance between the uppermost points of two adjacent periodic deformations of one expanded metal sheet is, depending on the surface area, preferably between 5 and 12.5 mm and more preferably between 6.5 and 11.5 mm.

In an embodiment of the present disclosure, the expanded metal sheets comprising periodic deformations formed in the forming step are cut and stacked in the stacking step to form a structured cross-channel packing element, wherein the layers of the structured cross-channel packing element are oriented such that the periodic deformations of the adjacent layers intersect in crisscross fashion with the periodic deformations of the layers extending obliquely relative to the longitudinal direction, wherein at least 50%, preferably at least 75% and most preferably all of the layers contact each of the adjacent layers at points of intersection between the periodic deformations of the layer and those of the adjacent layers and wherein the open space between the at least two layers is defined by the periodic deformations. The longitudinal direction of the structured cross-channel packing element is the direction from the top area to the bottom area of the structured cross-channel packing element when it is incorporated in a mass transfer and/or heat exchange column, i.e. the longitudinal direction is the direction from the top to the bottom of the mass transfer and/or heat exchange column. In other words, it is the intended gravity-driven flow direction of the heavier phase during the operation of the structured cross-channel packing element and mass transfer and/or heat exchange column, respectively. More specifically, the longitudinal direction of the structured cross-channel packing element may be determined as follows: The structured cross-channel packing element is placed on a horizontal area so that the layers of the structured cross-channel packing element being arranged in parallel and in touching contact with each other extend in the vertical direction and so that the open spaces (or channels, respectively, which are surrounded and thus defined by the periodic deformations of the layers) extending from one end to the opposite end of the layers extend from the top to the bottom of the structured cross-channel packing element. The longitudinal direction is then the direction from the top to the bottom of the so arranged structured cross-channel packing element, or, in other words: Heavy phase, for instance water, which is dropped onto the top of the so arranged structured cross-channel packing element flows gravity-driven downwards along the open spaces, wherein the longitudinal direction is the average flow direction of the heavy phase.

Preferably, the angle between each of the periodic deformations with respect to the longitudinal direction is 10° to 60°, preferably 20° to 50° and more preferably 25° to 47°, wherein the periodic deformations of adjacent expanded metal sheets are preferably oriented in opposing directions.

Good results are in particular obtained, if the maximum distance between at least 50%, preferably between at least 75%, more preferably between at least 80%, still more preferably between at least 90%, yet more preferably between at least 95% and most preferably between all of the at least two layers of the structured cross-channel packing element measured in the plane being perpendicular of the longitudinal direction is 8 to 80 mm, preferably 12 to 51 mm and most preferably 16 to 30 mm.

In line therewith, it is preferable that the layer width is 4 to 40 mm, more preferably 6 to 25.5 mm and most preferably 8 to 15 mm.

Furthermore, it is preferred that the packing element produced in the stacking step has a height of 100 to 300 mm and preferably of 150 to 250 mm.

Good results are in particular obtained, when the specific surface area of the structured packing element produced in step (f) is 60 to 750 m$^2$/m$^3$, preferably 120 to 500 m$^2$/m$^3$ and most preferably 200 to 450 m$^2$/m$^3$.

As set out above, the expanded metal sheets forming the structured cross-channel packing element each comprise openings that are surrounded and separated from each other by separating elements. In other words, the expanded metal sheets are grids. Preferably, the stretching is performed so that the layers of expanded metal sheet of the final structured cross-channel packing element have the following properties: Preferably, the ratio between the average width of at least one separating element between adjacent openings and the sheet material thickness is at least 15 and more preferably at least 18. The openings have preferably a lenticular or trapezoidal shape and have thus a shorter and a longer characteristic length, wherein the shorter characteristic length of an opening is the maximal dimension of the opening in the stretch direction of the expanded metal sheet and the longer characteristic length of an opening is the maximal dimension of the opening in the direction perpendicular to the stretch direction of the expanded metal sheet. The stretch direction of the expanded metal sheet is that direction, along which the sheet metal has been stretched during the production of the expanded metal sheet. Preferably, at least 50%, preferably at least 75%, more preferably at least 80%, still more preferably at least 90%, yet more preferably at least 95% and most preferably all of the openings have a shorter characteristic lengths of 1.0 to 4.0 mm and preferably 2.0 to 3.0 mm and a longer characteristic lengths of 2.0 to 8.0 mm, preferably 2.5 to 7.0 mm and most preferably 3.0 to 6.0 mm.

The distance between openings being adjacent in the stretch direction of the expanded metal sheet differ from the distance between openings adjacent in the direction perpendicular to the stretch direction of the expanded metal sheet. Subsequently, the distance between a first opening and a second opening in the stretch direction of the expanded metal sheet adjacent to each other is also referred to or abbreviated as $u_2$, whereas the distance between the first opening and a third opening in the direction perpendicular to the stretch direction of the expanded metal sheet adjacent to the first opening is also referred to or abbreviated as $u_1$. Preferably, the ratio between the distance $u_2$ and the distance $u_1$ is for at least 50%, preferably for at least 75%, more preferably for at least 80%, still more preferably for at least 90%, yet more preferably for at least 95% and most preferably for all openings 0.4 to 0.7, more preferably 0.45 to 0.70 and most preferably 0.49 to 0.55. In addition, it is preferred that the distance $u_2$ is for at least 50%, preferably for at least 75%, preferably for at least 80%, still more preferably for at least 90%, yet more preferably for at least 95% and most preferably for all openings 2 to 8 mm, more preferably 3 to 7 mm and most preferably 4 to 6 mm, whereas the distance $u_1$ is preferably for at least 50%, more preferably for at least 75%, even more preferably for at least 80%, still more preferably for at least 90%, yet more preferably for at least 95% and most preferably for all openings is 7.5 to 15 mm and most preferably 9 to 11 mm.

In accordance with a further embodiment of the present disclosure, the average width of at least 50%, preferably of at least 75%, more preferably of at least 80%, still more preferably of at least 90%, yet more preferably of at least 95% and most preferably of all separating elements between adjacent openings is between 70% and 125% of the average hydraulic diameter of the adjacent openings. More preferably, the average width of at least 50%, preferably of at least 75%, more preferably of at least 80%, still more preferably of at least 90%, yet more preferably of at least 95% and most preferably of all separating elements between adjacent openings is between 75% and 100% of the average hydraulic diameter of the adjacent openings. More preferably, the average width of at least 50%, preferably of at least 75%, more preferably of at least 80%, still more preferably of at least 90%, yet more preferably of at least 95% and most preferably of all separating elements between adjacent openings is 1.5 to 4.0 mm, even more preferably 1.6 to 3.5 mm and most preferably 1.8 to 3.0 mm. In addition, it is preferred that the hydraulic diameter of at least 50%, preferably of at least 75%, more preferably of at least 80%, still more preferably of at least 90%, yet more preferably of at least 95% and most preferably of all of the openings of each of the at least two layers is 1.25 to 5.0 mm, more preferably 2.0 to 4.0 mm most preferably 2.2 to 3.5 mm.

Moreover, it is preferred that the ratio between the maximum distance D between at least 50%, preferably between at least 75%, more preferably between at least 80%, still more preferably between at least 90%, yet more preferably between at least 95% and most preferably between all of the at least two layers measured in the plane being perpendicular of the longitudinal direction and the average width b of the separating elements is at least 5 and more preferably at least 8.

The parameters $u_2$ (distance between a first opening and a second opening being in the stretch direction of the expanded metal sheet adjacent to each other) and b (average width of the separating elements) may be used to calculate the stretching factor of the expanded metal sheet. More specifically, the stretching factor of the expanded metal sheet is defined as $u_2/2b$. The inverse of the stretching is a good indication of the material savings that can be realized compared to a solid metal sheet.

In accordance with a particular preferred embodiment of the present disclosure, the void fraction of all layers of the structured cross-channel packing element, i.e. the ratio of the total area of the openings in the layer divided by the sheet area of the layer, is between 20% and 38%.

BRIEF DESCRIPTION OF THE FIGURES

The invention will be explained in more detail hereinafter with reference to the drawings.

FIG. 2C is a schematic view of a sheet storage unit of the plant according to another embodiment of the present disclosure.

FIGS. 2D and 2E are schematic views of a sheet storage unit of the plant according to another embodiment of the present disclosure in two different stages.

FIG. 7A shows a schematic view of another embodiment of the grid structure of the expanded metal sheets of the layers of the structured cross-channel packing element produced with the process according to an embodiment of the present disclosure.

FIG. 7B shows a cutout along lines A-A of FIG. 7A.

FIG. 1 shows schematically the plant 10 for producing a structured cross-channel packing element for a column for mass transfer and/or heat exchange between a heavy and a light fluid phase in accordance with one embodiment of the present disclosure. The plant 10 comprises from its upstream end to its downstream end a decoiler 12, a stretching machine 14 for cutting and stretching a metal sheet to an expanded metal sheet, a calibration machine 16 for rolling the expanded metal sheet produced in the stretching machine to a desired thickness, a sheet storage unit 18, a forming machine 20 for forming the rolled expanded metal sheet produced in the calibration machine to an expanded metal sheet comprising periodic deformations and a stacking machine 22 for stacking expanded metal sheets comprising periodic deformations to a structured cross-channel packing element. The decoiler 12 is a sleeve, onto which a metal sheet is coiled. During the operation of the plant 10, the metal sheet is decoiled from the decoiler 12 and fed into the stretching machine 14, which comprises at least one knife for cutting (or slitting, respectively) and stretching within the same stroke of the stretching machine the metal sheet when the metal sheet is fed through the stretching machine using a pressured slitting and stretching process, so as to produce an expanded metal sheet. More specifically, the slits created by the knife allow the metal to be stretched, which produces uniform openings. To ensure a consistent pattern, the stretching machine 14 is programmed or operated manually as the metal is fed through. The stretching machine 14 works stroke-like, wherein the length of expanded metal sheet transported during one stroke of the stretching machine 14 is the product of the width of the separating elements and the stretching factor. The expanded metal sheet produced in the stretching machine 14 is guided into the calibration machine 16, which comprises at least two rollers, through which the expanded metal sheet is fed and provided with a pressure so as to roll the expanded metal sheet to a desired thickness or grid thickness, respectively.

Figure 1:
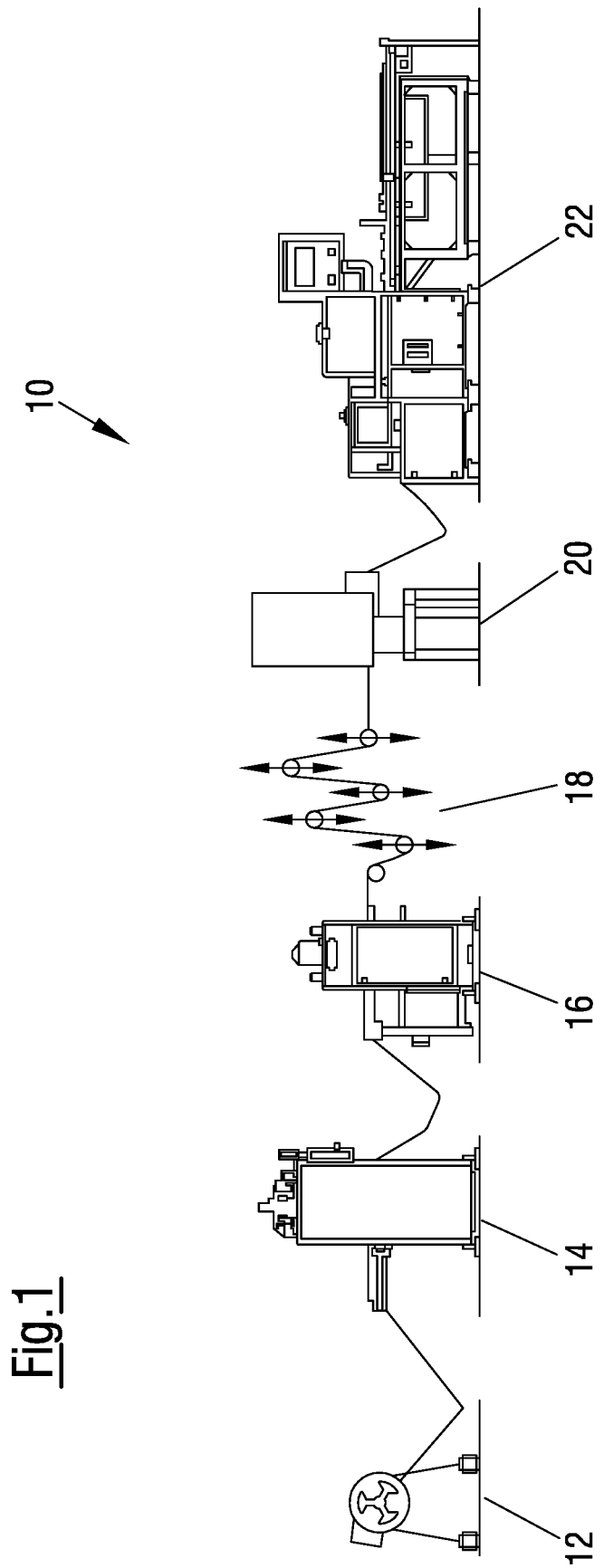
FIG. 1 is a schematic view of a plant according to one embodiment of the present disclosure.

The rolled expanded metal sheet produced is guided from the calibration machine 16 directly into the sheet storage unit 18, from which it is directly transferred into the forming machine 20. Preferably, the sheet storage unit 18 comprises at least two, more preferably at least four, still more preferably at least six and most preferably at least eight deflection rollers, which are all movable so that the distance between these deflection rollers can be varied. A specific embodiment of such a sheet storage unit 18 is shown in FIG. 2.

The forming machine 20 preferably comprises a device for continuously forwarding the rolled expanded metal sheet to one or more first shaping units for pleating the rolled expanded metal sheet and at least one device for drawing off the pleated expanded metal sheet, so as to produce an expanded metal sheet comprising periodic deformations. Thereafter, the expanded metal sheet comprising periodic deformations is guided into the stacking machine 22, which preferably comprises one or more rotating cutting wheels for cutting the rolled expanded metal sheet comprising periodic deformations to the desired size and a stacking unit for stacking the cut rolled expanded metal sheets comprising periodic deformations to a structured cross-channel packing element. Due to the cutting and stacking, the stacking machine 22 works discontinuously. During the cutting and stacking in the stacking machine 22, the forming machine 20 has to be stopped. Thus, also the forming machine 20 works stroke-like, wherein the length of expanded metal sheet transported during one stroke of the forming machine is the quotient of the distance between two adjacent periodic deformations of the sheet and the cosine of the angle α, by which the corrugations are inclined with respect to the longitudinal direction. For instance, for an expanded metal sheet with a distance between two adjacent periodic deformations of 20 mm, an angle α of 45° and a stretching factor of 1.25 the length of sheet transported during one stroke of the stretching machine is 2.5 mm, whereas the length of sheet transported during one stroke by the forming machine is 28.3 mm. Therefore, the expanded metal sheet prepared in the stretching machine and rolled in the calibration machine cannot be directly transported into the forming machine.

More specifically, the stretching machine 14 usually has a higher stroke frequency than the forming machine 20, but transports during a stroke less length of expanded metal sheet than the forming machine 20. Thus, when a stroke of the forming machine 20 starts, the forming machine 20 needs per given time interval more sheet length as transported by the stretching machine 14 during this time interval, whereas after termination of a stroke of the forming machine 20 the stretching machine 14 still transports sheet length, which is not required by the forming machine 20, until the next stroke of the forming machine 20 starts. In accordance with the present disclosure, the different material requirements of the stretching machine 14 and the forming machine 20 over the different stroke cycles of both machines 14, 20 are compensated or buffered, respectively, by the sheet storage unit 18. The movable rollers of the sheet storage unit 18 allow to load the sheet storage unit 18 with rolled expanded metal sheet produced by the stretching machine 14 and the calibration machine 16 during the time interval between two strokes of the forming machine 20 by simply increasing the distance between the rollers proportionally to the excess sheet length received from the calibration machine 16 and not required by the forming machine 20 at this point of time. Moreover, the movable rollers allow to unload the sheet storage unit 18 from rolled expanded metal sheet stored therein during the time interval of a stroke of the forming machine 20 by simply decreasing the distance between the rollers proportionally to the excess sheet length required by the forming machine 20 in excess to that sheet length received during this point of time from the calibration machine 16.

As shown in FIG. 1, the sheet storage unit 18 is configured to directly receive the rolled expanded metal sheet produced in the calibration machine 16 and release the rolled expanded metal sheet directly to the forming machine 20.

Figure 2A:
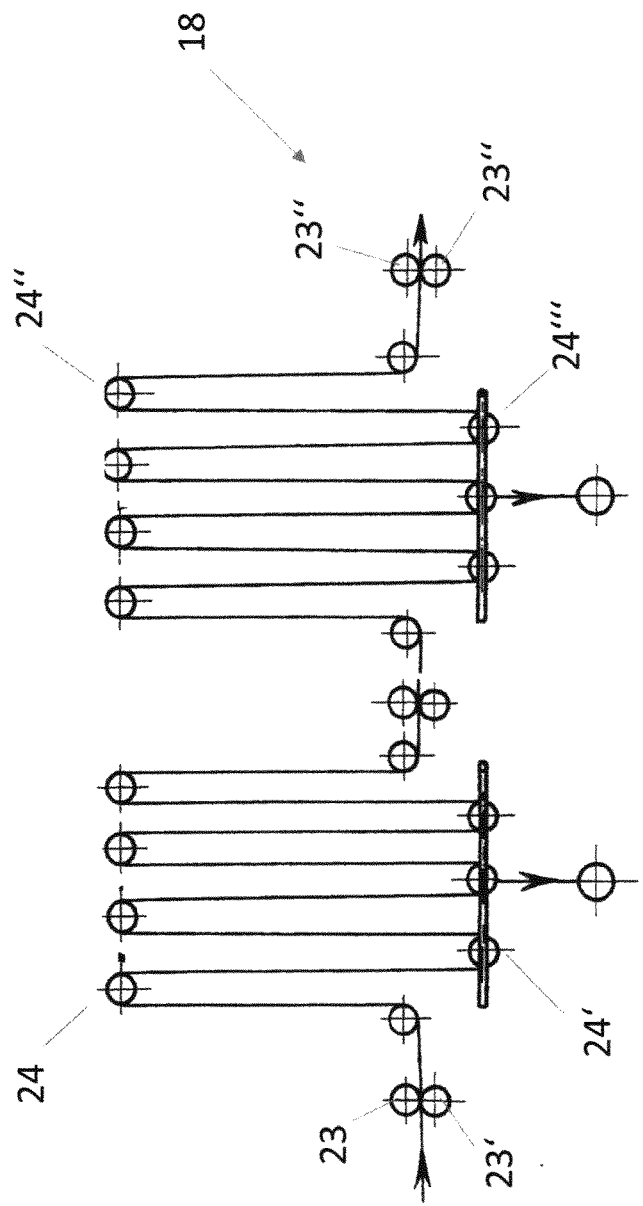
FIG. 2A is a schematic view of a sheet storage unit of the plant according to one embodiment of the present disclosure.

FIG. 2A is a schematic view of a sheet storage unit 18 of the plant 10 according to one embodiment of the present disclosure. The sheet storage unit 18 comprises six non-movable rollers 23, 23', 23", 23'" and 14 movable rollers 24, 24', 24", 24'" being movable in the vertical direction. Thereby, the distances between the single movable rollers 24, 24', 24", 24'" can be adjusted as needed and thereby and the total distance between the most upstream movable roller 24 and the most downstream movable roller 24'" can be adjusted as needed. The total distance between the most upstream movable roller 24 and the most downstream movable roller 24'" defines the length of rolled expanded metal sheet, which is stored at a certain point of time in the storage unit 18. If more rolled expanded metal sheet needs to be stored, the total distance between the most upstream movable roller 24 and the most downstream movable roller 24'" is increased, whereas the total distance between the most upstream movable roller 24 and the most downstream movable roller 24'" is decreased, when the forming machine 20 performs a stroke.

Figure 2B:
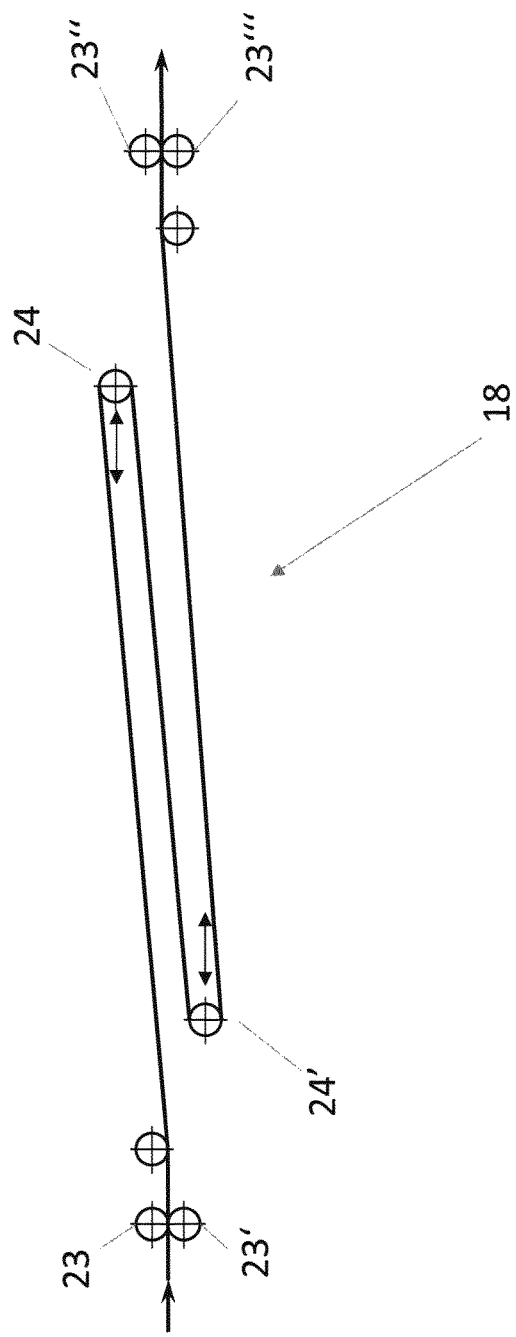
FIG. 2B is a schematic view of a sheet storage unit of the plant according to another embodiment of the present disclosure.

FIG. 2B is a schematic view of a sheet storage unit 18 of the plant 10 according to another embodiment of the present disclosure. The sheet storage unit 18 comprises six non-movable rollers 23, 23', 23", 23'" and two movable rollers 24, 24' being movable in the horizontal direction. Thereby, the distances between the single movable rollers 24, 24' can be adjusted as needed, and thereby and the total distance between the most upstream movable roller 24 and the most downstream movable roller 24' and thus the total length of the expanded metal sheet in the storing unit 18 can be adjusted as needed.

FIG. 2C is a schematic view of a sheet storage unit 18 of the plant 10 according to another embodiment of the present disclosure. The sheet storage unit 18 comprises four non-movable rollers 23, 23', 23", 23'", two non-movable curved deflection plates 25, 25' and one movable roller 24 that are movable in the vertical direction. Thereby, the total distance from the first deflection plate 25 via the movable roller 24 to the second deflection plate 25 and thus the total length of the expanded metal sheet in the storing unit 18 can be adjusted as needed.

FIGS. 2D and 2E are schematic views of a sheet storage unit 18 of the plant 10 according to another embodiment of the present disclosure in two different stages. The sheet storage unit 18 comprises four non-movable rollers 23, 23', 23", 23'" and two non-movable curved deflection plates 25, 25'. Thereby, the total length of the expanded metal sheet between the two deflection plates 25, 25' can be varied. More specifically, the storage of the expanded metal sheet is effected so that expanded metal sheet 18 is pushed for storing in the sheet storage unit 18 into the space between the deflection structure 25, 25' by pushing the expanded metal sheet faster over the upstream deflection plate 25 than withdrawing the expanded metal sheet over the downstream deflection plate 25' so that more length of the expanded metal sheet is present in the storage unit 18 and, as shown in FIG. 2D, placed on the floor 27. For unloading the storage unit 18, the expanded metal sheet is withdrawn over the downstream deflection plate 52' faster than it is pushed over the upstream deflection plate 52 so that less length of the expanded metal sheet is present in the storage unit 18 as shown in FIG. 2E.

Figure 3:
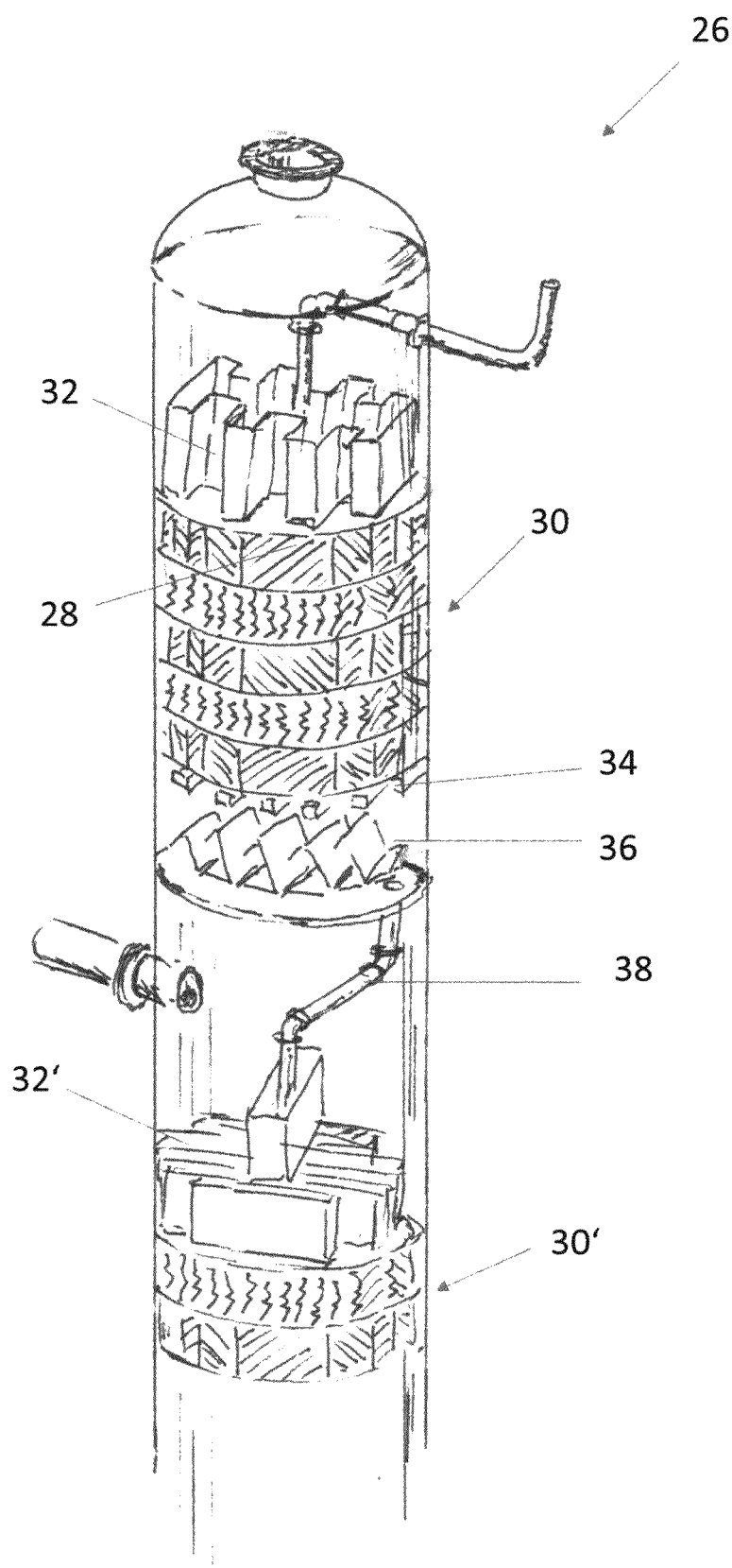
FIG. 3 is a schematic side view of a mass transfer column including several structured cross-channel packing elements produced with the process according to one embodiment of the present disclosure.

FIG. 3 shows is a schematic side view of a mass transfer column 26 and more specifically a distillation column 26 comprising structure packing elements produced according to the process of the present disclosure (the transparent inside of the figure is only for illustrative purposes). Also for illustrative purposes, the grid structure of the layers in not shown in FIG. 3, but only in FIGS. 6A-6F and 7A-7B. The distillation column 26 comprises a plurality of structured cross-channel packing elements 28, which are arranged in form of two beds 30, 30'. Above each of the two beds 30, 30' a distributor 32, 32' is arranged to evenly distribute the liquid over the cross-section of the bed, while leaving enough space for the vapor to ascend through it. Below each bed 30, 30' a grid-like holding device 34 and a collector 36 are arranged, wherein the grid-like holding device 34 keeps the bed 30 at its position and the collector 36 collects the liquid trickling down from the bed 30, while sufficient open space is left in the collector for the vapor to ascend.

During the operation of the distillation column 26, gas ascends as light phase from the bottom to top, whereas liquid as heavy phase descends in counter-current from the top to the bottom of the distillation column 26. More specifically, the liquid is essentially homogenously distributed by the distributor 32 over the cross-section of the bed 30 and trickles down along the surfaces of the layers of the structured cross-channel packing elements 28. Between the different layers of the structured cross-channel packing elements 28 open spaces are provided, which are filled with the gas and provide a path for the gas to ascend, while it is driven by a pressure gradient. By allowing the liquid to spread on the surface of the layers of the structured cross-channel packing elements 28, a large interface is created between the two phases so that an efficient heat and mass transfer between the liquid and the gas is established at the interface. At the bottom of the bed 30, the liquid is collected in the collector 36 and guided via the pipe 38 down to the distributor 32' above the second bed 30'.

Figure 4A:
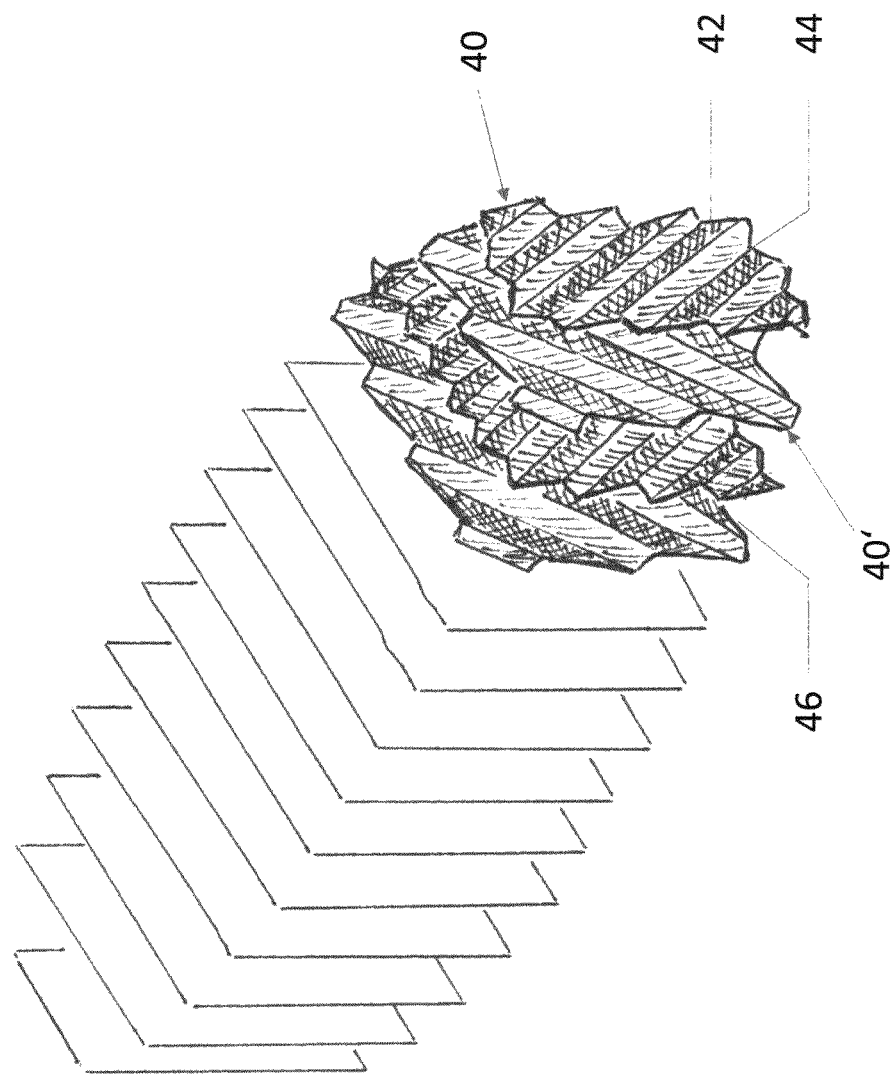
FIG. 4A is an explosion view of a part of the sheets of a structured cross-channel packing element produced with the process according to one embodiment of the present disclosure.
Figure 4B:
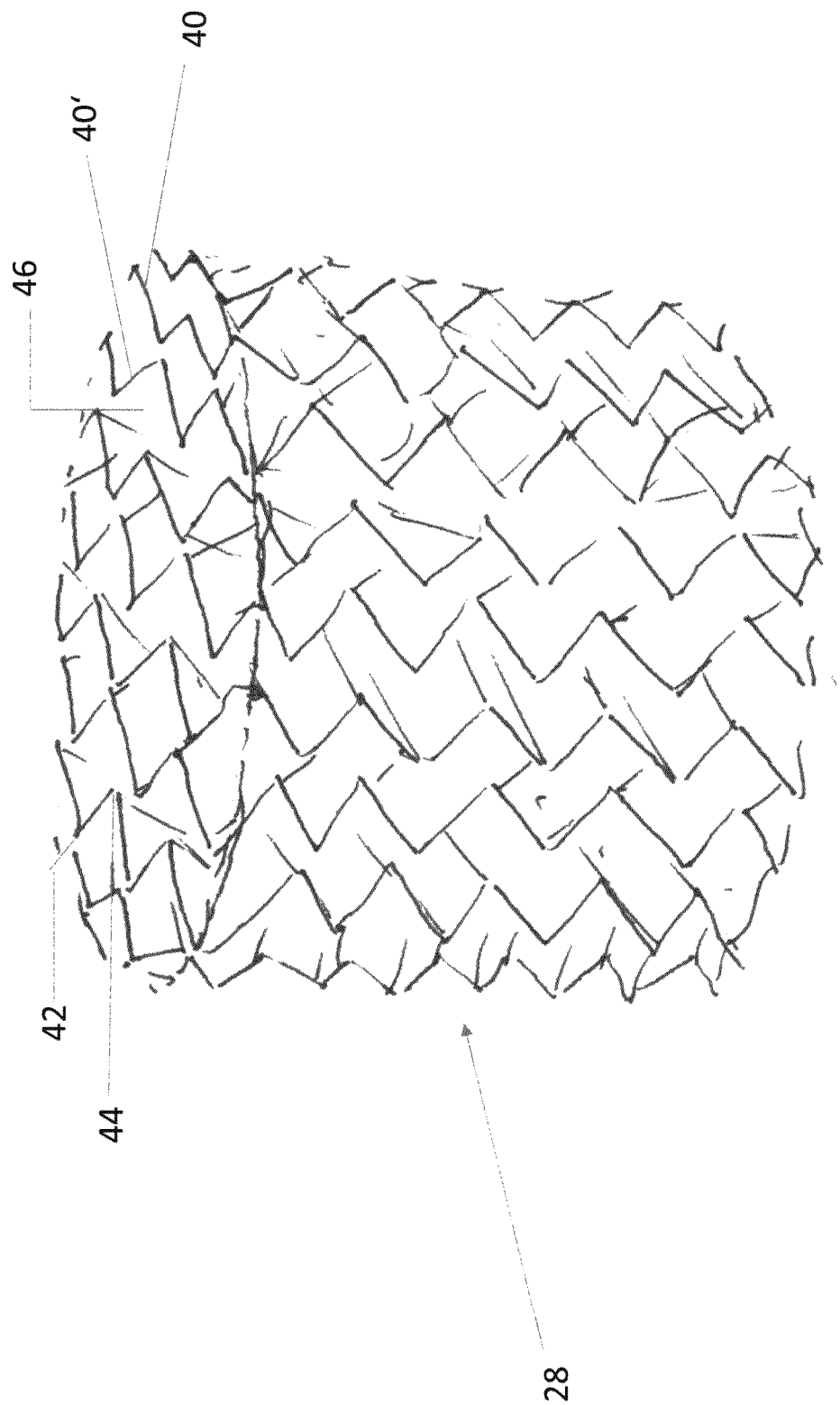
FIG. 4B is a schematic side view of the structured cross-channel packing element shown in FIG. 4A.
Figure 4C:
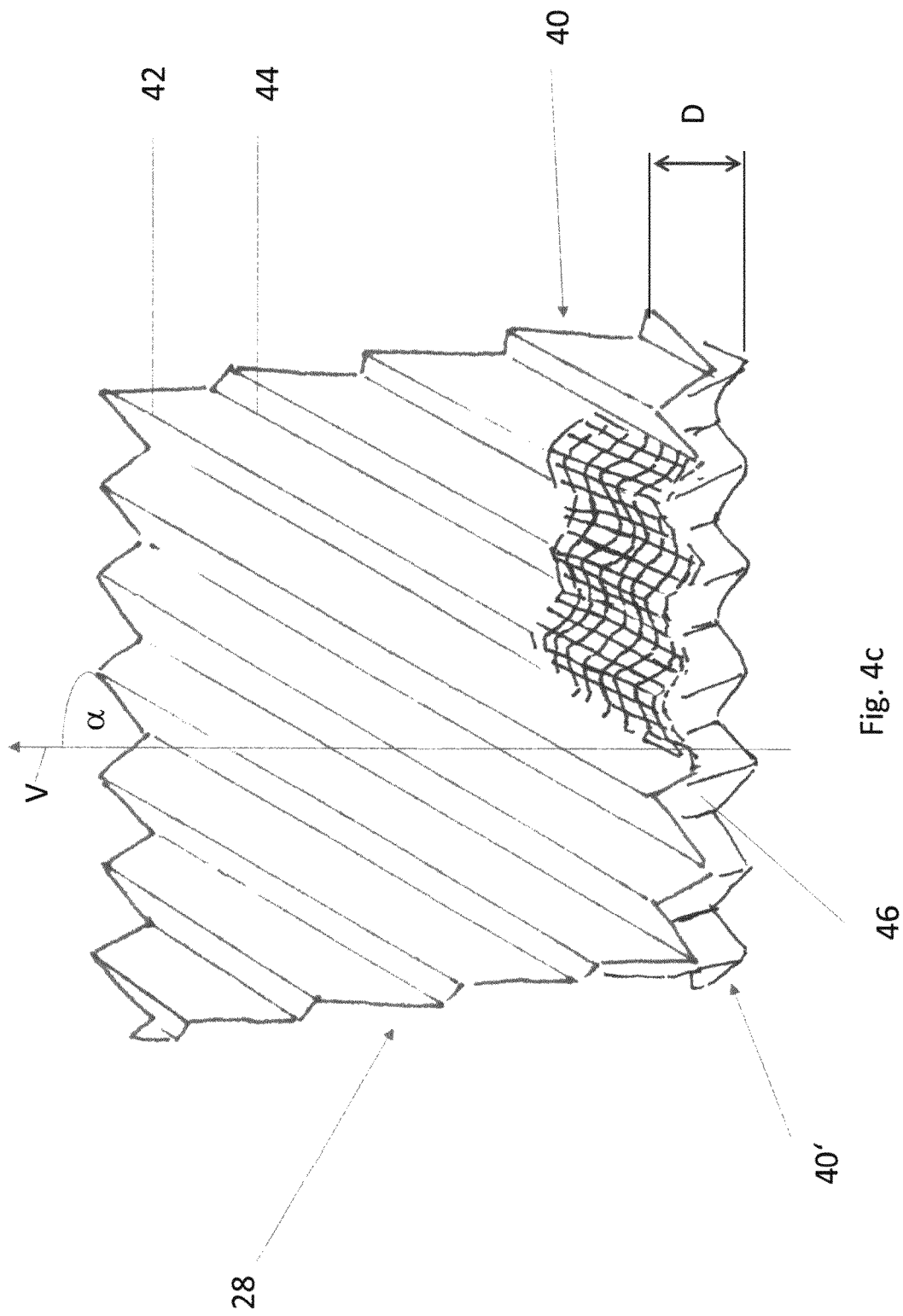
FIG. 4C shows two layers of the structured cross-channel packing element shown in FIG. 4A.

FIGS. 4A to 4C show a structured cross-channel packing element 28 of the so-called cross-channel corrugated sheet packing type. For illustrative purposes, the grid structure of the layers in not shown in FIGS. 4A-4C, but only in FIGS. 6A-6F and FIGS. 7A and 7B. The structured cross-channel packing element 28 is assembled from a plurality of corrugated sheets 40, 40', which are parallel and in touching contact with each other. Each of the corrugated sheets 40, 40' is a grid as described above and as described in further detail below according to FIGS. 7A and 7B. At the bottom right of FIG. 4C the grid-structure of a part of the corrugated sheet 40 is schematically indicated. As it is understood from the above specification, indeed all of the corrugated sheets 40, 40' consists of such grids, which is not shown in FIGS. 4A to 4C only for illustrative reasons. In the present embodiment, the corrugated sheets 40, 40' are made of expanded sheet material, i.e. they are prepared by cutting and stretching a thin metal plate and then deforming the expanded sheet metal to corrugated sheets 40, 40'.

The corrugated metal sheets 40, 40' are fixed to each other by means of several rods (not shown) penetrating the corrugated sheets 40, 40' perpendicular to the longitudinal section of the corrugated sheets 40, 40', wherein the rods are fixed to the first and last corrugated sheet using a washer and a nut or by bending the rods or by any other means (not shown). Each corrugated 40, 40' comprises a plurality of alternately oriented peaks 42 and valleys 44, wherein adjacent corrugated sheets 40, 40' are oriented such that the corrugations 42, 44 of the adjacent corrugated sheets 40, 40' intersect in crisscross fashion with the corrugations 42, 44 of the corrugated sheets 40, 40' extending obliquely relative to the longitudinal direction, thus forming inclined channels 46 which continuously cross one another. More specifically, angle α between each of the peaks 42 and each of the valleys 44 with respect to the longitudinal direction is 10° to 60°, preferably 20° to 50° and most preferably 25° to 47°, wherein the peaks 42 and valleys 44 of adjacent layers 40, 40' are oriented in opposing directions. The channels 46 define a maximum distance D between adjacent corrugated sheets 40, 40', such as for example of 20 mm. These channels 46 positively influence the flows of the gas phase and of the liquid phase within the structured packing cross-channel element 28 and facilitate the mass transfer between the phases. That is, the gas phase and liquid phase are brought into contact in the channels 46 of the structured cross-channel packing element 28 and the mass transfer as well as the heat transfer between the phases is thus facilitated. More specifically, ascending gas comes into contact with liquid, which is present on the surface of the corrugated sheets 40, 40' defining the channels 46, when it flows downwardly through the mass transfer column. All in all, the light phase flows through the open space or channels 46, respectively, without a bypass flow through the openings of the grid of the corrugated sheets 40, 40' of the structured cross-channel packing element 28. This leads to a particularly efficient mass and energy transfer between the light and heavy phases. Moreover, the crisscross fashion of the channels 46 leads to an optimal distribution of the phases from left to right.

Figure 5:
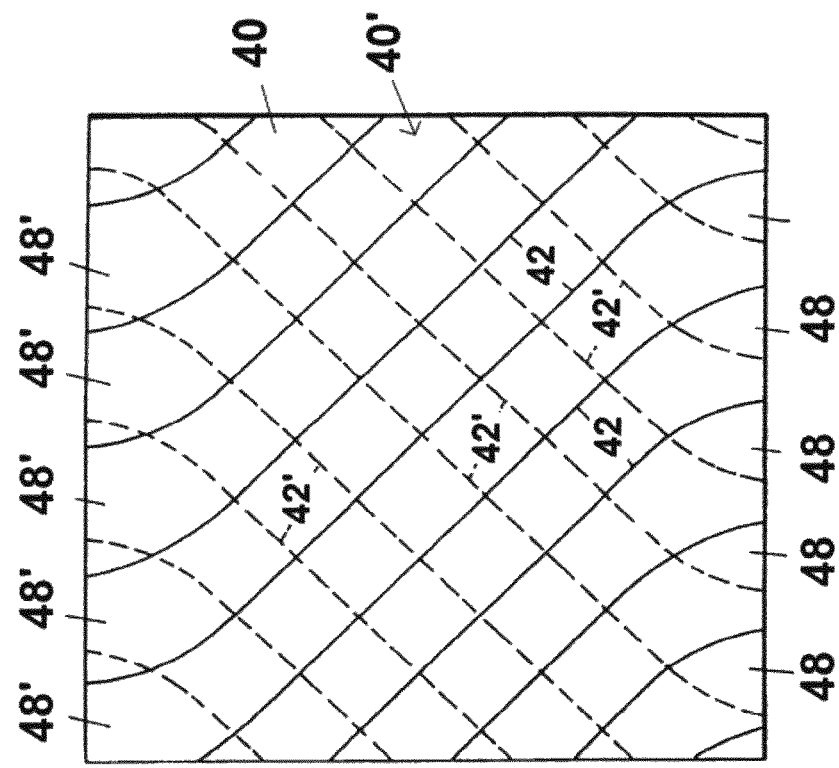
FIG. 5 is a fragmentary view of a corrugated sheet of a structured cross-channel packing element produced with the process according to another embodiment of the present disclosure.

FIG. 5 shows a fragmentary view of a corrugated sheet 40 of a structured cross-channel packing element in accordance with an alternative embodiment. The corrugated sheet 40 of the structured cross-channel packing element of FIG. 5 is similar to that shown in FIGS. 4A to 4C corrugated sheets 40, 40'. However, the corrugated sheet 40 of the structured cross-channel packing element of FIG. 5 does not comprise linear extending peaks and valleys, but the peaks 42, 42' and valleys of the corrugated sheets 40, 40' are bent in the terminal portions 48, 48' so as to extend in the terminal portions 48, 48' of the corrugated sheets 40, 40' essentially in the vertical direction. In FIG. 5, the solid lines depict the peaks 42 of the corrugations in the face of the corrugated sheet 40 presented to the viewer, while the broken lines 42' depict the peaks of the corrugations in the corresponding face of the corrugated sheet 40' immediately behind the one in view. By bending the terminal portions 48, 48' so as to extend in the terminal portions 48, 48' of the corrugated sheets 40, 40' essentially in the vertical direction, the flow resistance of the terminal portions 48, 48' of the corrugated sheets 40, 40' is reduced compared to the flow resistance of the portions located between the terminal portions 48, 48' of the corrugated sheets 40, 40'. This leads to a reduced pressure loss of the structured cross-channel packing element.

Figure 6:
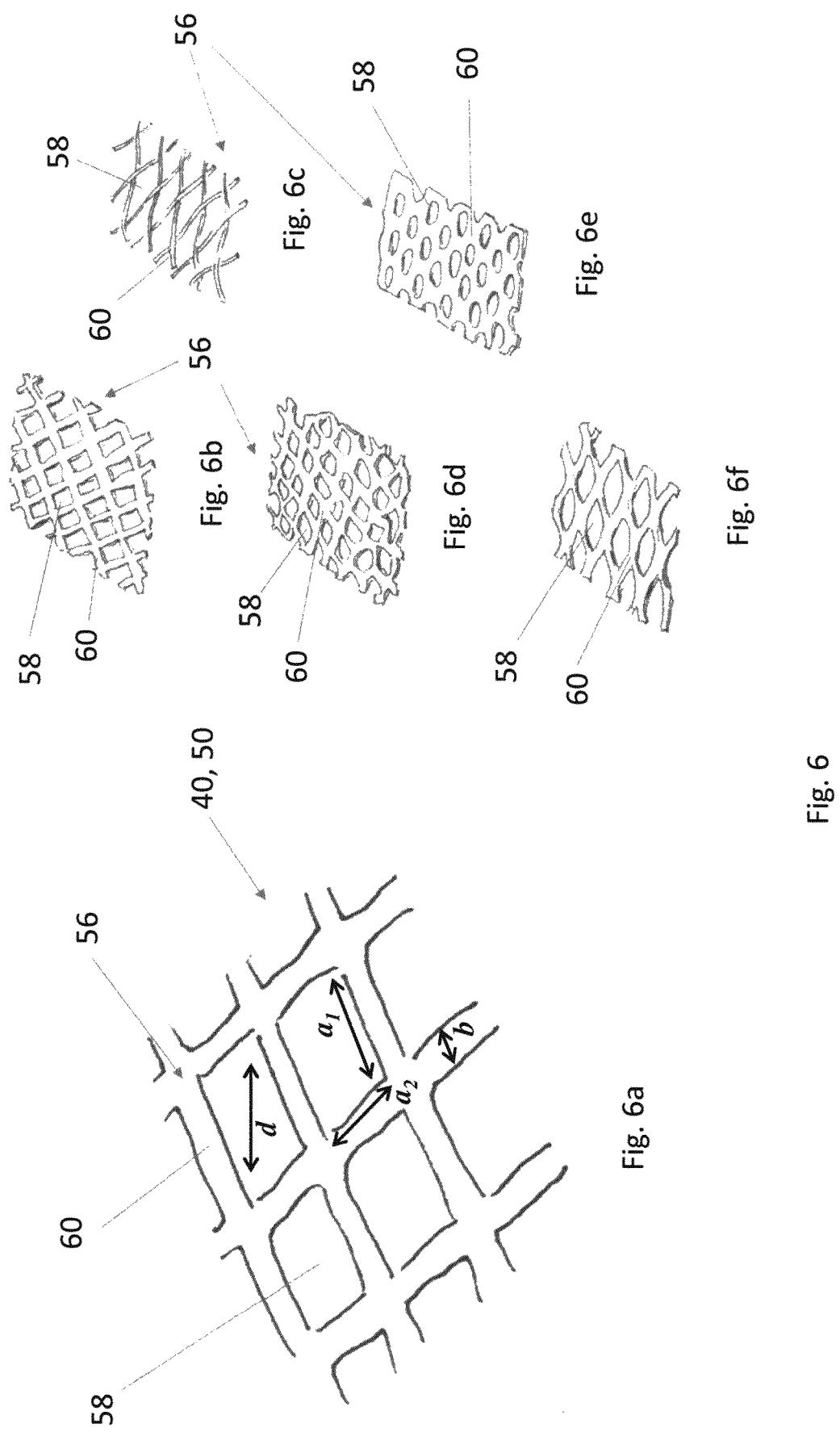
FIGS. 6A-6F are schematic views of different embodiments of the grid structure of the expanded metal sheets of the layers of the structured cross-channel packing element produced with the process according to the present disclosure.

FIGS. 6A to 6F are schematic views of different embodiments of the grid 56 that forms the layers 50 of the structured cross-channel packing element produced according to the present disclosure, which are for instance suitable to be used in a structured cross-channel packing element as shown in any of FIGS. 4A to 4C and FIG. 5. The grid 56 of the layer 50 of the structured cross-channel packing element shown in FIG. 6A comprises openings 58 with a quadrilateral cross-section, wherein the openings 58 are surrounded and separated from each other by separating elements 60. The separating elements 60 are thin strips with an average width b of, for example, 2 mm, wherein the separating elements 60 completely surround the openings 58. The two side lengths $a_1$, $a_2$ of the openings 58 are selected so as to result in an opening 58 with a suitable hydraulic diameter d of, for instance, 3 mm. As known in the field, the hydraulic diameter d may be calculated in accordance with the formula 4 A/P, wherein A is the cross-sectional area of the opening 40 and P is the perimeter of the opening 58. Grids 56 with a different geometry of the openings 58 and a different geometry of the separating elements 60 are shown in FIGS. 6B to 6F. The openings 58 of the grids 56 of FIGS. 6B and 6C are quadrilateral, whereas the openings 58 of the grid 56 of FIG. 6D are irregular and the openings 58 of the grids 56 of FIGS. 6E and 6F are ellipsoid.

FIG. 7A shows a schematic view of another embodiment of the grid structure of the expanded metal sheets of the layers of the structured cross-channel packing element produced with the process according to the present disclosure. The expanded metal sheet is a grid 56 comprising openings 58 having an essentially trapezoidal form, which are separated from each other by the separating elements 60. Accordingly, the openings have a shorter characteristic length and a longer characteristic length, wherein the shorter characteristic length of an opening 58 is the maximal dimension of the opening 58 in the stretch direction SD of the expanded metal sheet and the longer characteristic length of an opening 58 is the maximal dimension of the opening 58 in the direction perpendicular to the stretch direction SD of the expanded metal sheet. As shown in FIG. 7B, which is a cutout along lines A-A of FIG. 7A, the expanded metal sheet is not flat anymore, but rather has a structured surface. This is the result of deformation, distortion, bending or vaulting of individual separating elements and a relative deformation of separating elements compared to others, e.g. by tilting. More specifically, the expanded metal sheet comprises in stretch direction SD flat flanks, but in the opposite direction comparable steep flanks. The present disclosure allows transportation of the expanded metal sheet in the stretch direction SD, i.e. with its flat-flanked side, into the forming machine 20.

The invention claimed is:

1. A plant for producing a structured cross-channel packing element for a column for at least one of mass transfer and heat exchange between a heavy fluid phase and a light fluid phase, the structured cross-channel packing element comprising:
   at least two adjacent layers made of expanded metal sheets each comprising openings that are surrounded and separated from each other by separating elements, and the expanded metal sheets each comprising periodic deformations,
   wherein at least two of the at least two layers are arranged in a longitudinal direction of the structured cross-channel packing element parallel and in touching contact with each other such that an open space extending from one end to an opposite end of the at least two layers is provided between the at least two layers such that at least one of the heavy fluid phase and the light fluid phase may flow therethrough, wherein the plant comprises:
   a stretching machine configured to cut and stretch a metal sheet to form one of a plurality of first expanded metal sheets,
   a calibration machine configured to roll each of the first expanded metal sheets produced in the stretching machine to a desired thickness,
   a sheet storage unit,
   a forming machine configured to form each of the first expanded metal sheets rolled in the calibration machine to form the expanded metal sheets comprising periodic deformations, and
   a stacking machine configured to stack the expanded metal sheets comprising periodic deformations to form the structured cross-channel packing element,
   wherein the sheet storage unit is configured to directly receive each of the first expanded metal sheets rolled in the calibration machine and to release the first expanded metal sheets directly to the forming machine.

2. The plant according to claim 1, wherein the stretching machine is configured to operate with a first stroke frequency and the forming machine is configured to operate with a second stroke frequency, wherein the first stroke frequency is greater than the second stroke frequency.

3. The plant according to claim 2, wherein the stretching machine is configured to release during each stroke a first length of one of the first expanded metal sheets, and the forming machine is configured to release during each stroke a second length of one of the expanded metal sheets comprising periodic deformations, wherein the first length is smaller than the second length.

4. The plant according to claim 1, wherein the sheet storage unit comprises at least two deflection structures.

5. The plant according to claim 4, wherein the deflection structures include at least two curved deflection plates that are not movable.

6. The plant according to claim 4, wherein the deflection structures include at least two curved deflection plates, at least one of which is movable such that that a distance between at least two of the deflection structures can be varied.

7. The plant according to claim 4, wherein the deflection structures include at least two deflection rollers, at least one of which is movable such that a distance between at least two of the deflection structures can be varied.

8. The plant according to claim 1, wherein the stretching machine comprises at least one knife configured to, within a same stroke of the stretching machine, cut and stretch the metal sheet when the metal sheet is fed through the stretching machine.

9. The plant according to claim 1, wherein the forming machine comprises at least one first shaping unit configured to pleat each of the first expanded metal sheets, a device for continuously forwarding each of the first expanded metal sheets to the at least one first shaping, and at least one device for drawing off the pleated first expanded metal sheets.

10. A process for producing a structured cross-channel packing element for a column for at least one of mass transfer and heat exchange between a heavy fluid phase and a light fluid phase, the structured cross-channel packing element comprising:
   at least two adjacent layers made of expanded metal sheets each comprising openings that are surrounded and separated from each other by separating elements, and the expanded metal sheets each comprising periodic deformations,
   wherein at least two of the at least two layers are arranged in a longitudinal direction of the structured cross-channel packing element parallel and in touching contact with each other such that an open space extending from one end to an opposite end of the at least two layers is provided between the at least two layers such that at least one of the heavy fluid phase and the light fluid phase may flow therethrough, wherein the process comprises:
   cutting and stretching a metal sheet to form one of a plurality of first expanded metal sheets,
   rolling each of the first expanded metal sheets to a desired thickness,
   feeding the first expanded metal sheets directly to a sheet storage unit,
   transporting the first expanded metal sheets directly from the sheet storage unit to a forming machine,
   forming the first expanded metal sheets in the forming machine to form the expanded metal sheets comprising periodic deformations, and stacking the expanded metal sheets comprising periodic deformations to form a structured cross-channel packing element.

11. The process according to claim 10, wherein the process is performed in a plant according to claim 1.

12. The process according to claim 10, wherein the metal sheet is stretched by a stretching factor of more than 1.0 to 1.5.

13. The process according to claim 10, wherein each of the first expanded metal sheets is rolled to a thickness of 1.0 to 1.4 mm.

14. The process according to claim 10, wherein;
the metal sheet is stretched using a stretching machine,
the sheet storage unit includes rollers,
during a stroke of the stretching machine, the rollers of the sheet storage unit are moved so as to increase a distance between the rollers, and
during a stroke of the forming machine, the rollers of the sheet storage unit are moved so as to decrease the distance between the rollers.

15. The process according to claim 10, wherein the periodic deformations of the expanded metal sheets are corrugations comprising a plurality of alternately oriented peaks and valleys, and an angle between each of the peaks and each of the valleys with respect to the longitudinal direction is 10° to 60°.

\* \* \* \* \*